United States Patent
Navarro Sorroche et al.

(10) Patent No.: US 10,274,638 B2
(45) Date of Patent: Apr. 30, 2019

(54) DOWNHOLE GAMMA-RAY GENERATORS AND SYSTEMS TO GENERATE GAMMA-RAYS IN A DOWNHOLE ENVIRONMENT

(71) Applicant: Halliburton Energy Services, Inc., Houston, TX (US)

(72) Inventors: Juan Navarro Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/558,953

(22) PCT Filed: Dec. 21, 2016

(86) PCT No.: PCT/US2016/068109
§ 371 (c)(1),
(2) Date: Sep. 15, 2017

(87) PCT Pub. No.: WO2018/118054
PCT Pub. Date: Jun. 28, 2018

(65) Prior Publication Data
US 2018/0246250 A1    Aug. 30, 2018

(51) Int. Cl.
*G01V 5/12* (2006.01)
*H01S 3/223* (2006.01)
*H01S 3/13* (2006.01)
*H01S 3/11* (2006.01)
*H01S 3/041* (2006.01)
*H01S 3/16* (2006.01)
*H01S 3/04* (2006.01)
(Continued)

(52) U.S. Cl.
CPC .......... *G01V 5/125* (2013.01); *E21B 47/1015* (2013.01); *G21K 1/08* (2013.01);
(Continued)

(58) Field of Classification Search
CPC ....... G01V 5/125; H01S 3/0405; H01S 3/041; H01S 3/042; H01S 3/11; H01S 3/13; H01S 3/1625; H01S 3/1636; H01S 3/2232
See application file for complete search history.

(56) References Cited

U.S. PATENT DOCUMENTS 8,971,473 B2  3/2015  Leung et al.
9,022,914 B2  5/2015  Clayton et al.
(Continued)

FOREIGN PATENT DOCUMENTS

EP    2887103 A1   6/2015
EP    2887775 A1   6/2015
WO    2016176260 A1  11/2016

OTHER PUBLICATIONS

International Search Report and Written Opinion dated Aug. 18, 2017; International PCT Application No. PCT/US2016/068109.

*Primary Examiner* — Marcus H Taningco
(74) *Attorney, Agent, or Firm* — McGuireWoods LLP

(57) ABSTRACT

The disclosed embodiments include downhole gamma-ray generators and methods to utilize downhole gamma-ray generators in a downhole environment. In one embodiment, a downhole gamma-ray generator includes a target foil formed from a first material. The downhole gamma-ray generator also includes a second layer deposited along a back surface of the target foil. The downhole gamma-ray generator further includes a laser system operable to direct optical pulses onto a front surface of the target foil to ionize atoms of the first material, where electrons produced by ionization of the first material propagate through the target foil and decelerates when the electrons interact with the high density material, and where the deceleration of the electrons produces gamma-rays that are utilized to obtain one or more formation properties of a downhole formation.

20 Claims, 4 Drawing Sheets

(51) Int. Cl.
  *H01S 3/042* (2006.01)
  *G21K 1/08* (2006.01)
  *E21B 47/10* (2012.01)

(52) U.S. Cl.
  CPC .............. *H01S 3/041* (2013.01); *H01S 3/042* (2013.01); *H01S 3/0405* (2013.01); *H01S 3/11* (2013.01); *H01S 3/13* (2013.01); *H01S 3/1625* (2013.01); *H01S 3/1636* (2013.01); *H01S 3/2232* (2013.01)

(56) References Cited

U.S. PATENT DOCUMENTS

| | | | |
|---|---|---|---|
| 2006/0067941 A1* | 3/2006 | Buzatu | A61K 41/0095 424/178.1 |
| 2006/0257315 A1* | 11/2006 | Magill | A61K 41/00 424/1.11 |
| 2009/0045355 A1* | 2/2009 | Desbrandes | H01J 43/18 250/503.1 |
| 2009/0065712 A1* | 3/2009 | Zillmer | G21F 5/02 250/496.1 |
| 2009/0230314 A1* | 9/2009 | Leung | G01V 5/0091 250/390.01 |
| 2012/0080618 A1* | 4/2012 | Clayton | H05H 15/00 250/492.3 |
| 2012/0126104 A1* | 5/2012 | Teague | H01J 35/02 250/253 |
| 2012/0275557 A1* | 11/2012 | Gentile | G21G 1/12 376/186 |
| 2012/0318968 A1 | 12/2012 | Inanc | |
| 2015/0124921 A1 | 5/2015 | Groves et al. | |
| 2015/0369956 A1 | 12/2015 | Ma et al. | |

* cited by examiner

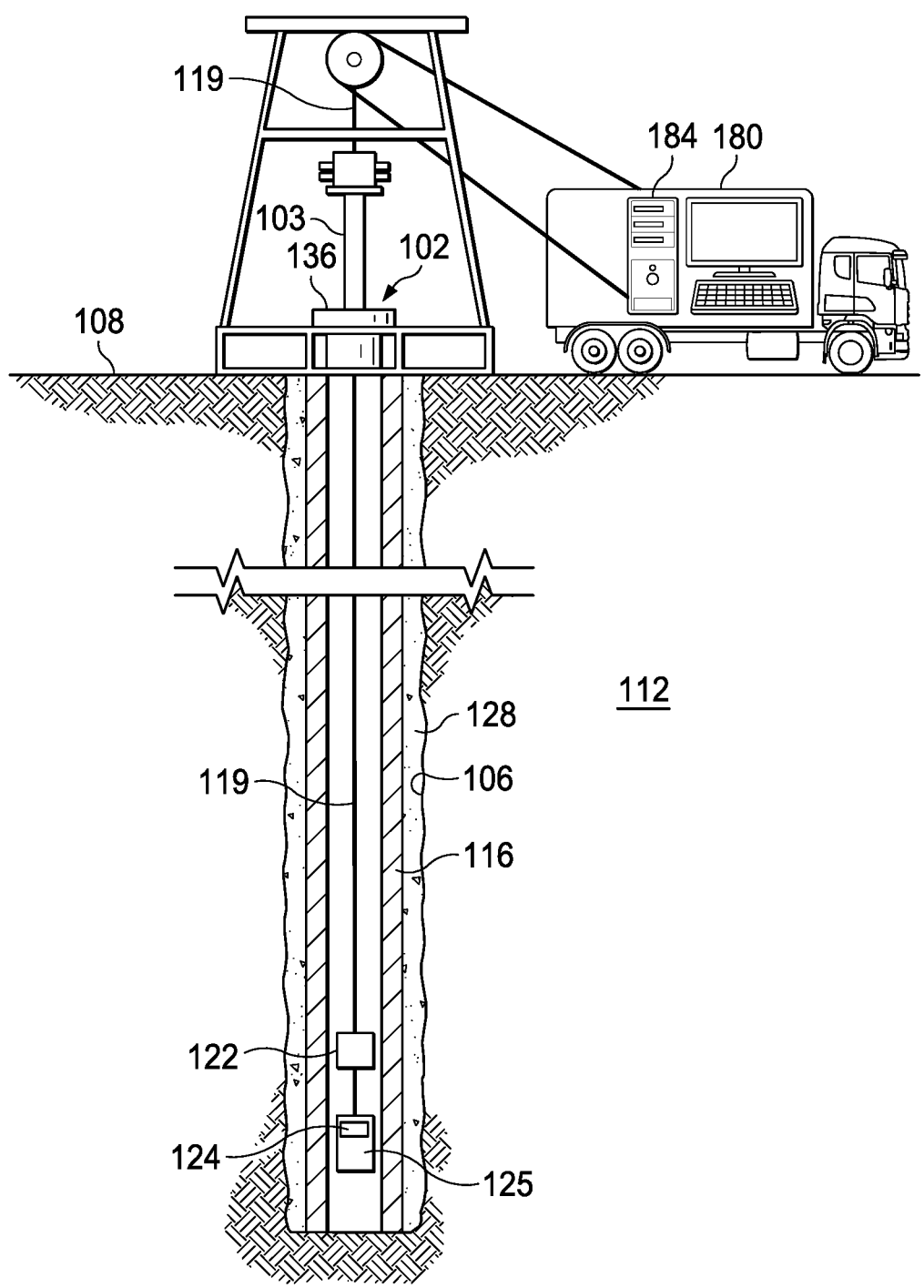

DOWNHOLE GAMMA-RAY GENERATORS AND SYSTEMS TO GENERATE GAMMA-RAYS IN A DOWNHOLE ENVIRONMENT

BACKGROUND

The present disclosure relates generally to downhole gamma-ray generators, methods to generate gamma-rays in a downhole environment, and methods to log formation data.

Oil and gas companies often utilize different logging techniques to obtain a record of petrophysical properties of a formation, such as, but not limited to, formation density, formation resistivity, formation anisotropy, dip angle of formation bed, radioactivity of the formation, formation porosity, acoustic properties of the formation, and formation pressure properties as well as other properties of the formation (collectively referred to as "formation properties"). Some conventional logging tools utilize always-on, radioactive chemical sources that generate energetic particles, such as neutrons and gamma-rays that interact with the surrounding formation, and utilize sensors to detect resulting signals indicative of the formation properties of the surrounding formation. For example, one commonly used gamma-ray source utilizes Cesium 137 isotopes, which are unstable and emit gamma-rays having energies around 660 KeV as byproducts of radioactive decay. However, Cesium 137 has a half-life of approximately 30 years, and the radioactive decay of Cesium 137 cannot be manually switched on or off. Further, Cesium 137 as well as other commonly used chemical sources are hazardous materials of high environmental impact.

Certain types of gamma-ray sources utilize electron impact ionization as well as direct field ionization techniques to produce gamma-rays. Common designs of gamma-ray sources that utilize the foregoing techniques also utilize an Ultra High voltage ("UHV") unit in order to generate gamma-rays having sufficient energy to penetrate the surrounding formation. The UHV unit of such designs is often housed in a housing having an outer diameter of approximately 2 inches and a length of approximately 5 feet. In a downhole environment, the length of the UHV unit significantly increases the size, complexity, and cost of the neutron and gamma-ray sources. Further, it may not be feasible to deploy the UHV in an annulus of a production casing or a wellbore due to the dimensions of the UHV.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1A illustrates a schematic view of a wireline logging environment in which a downhole gamma-ray generator is deployed on a wireline in an annulus of a casing;

Figure 1B:
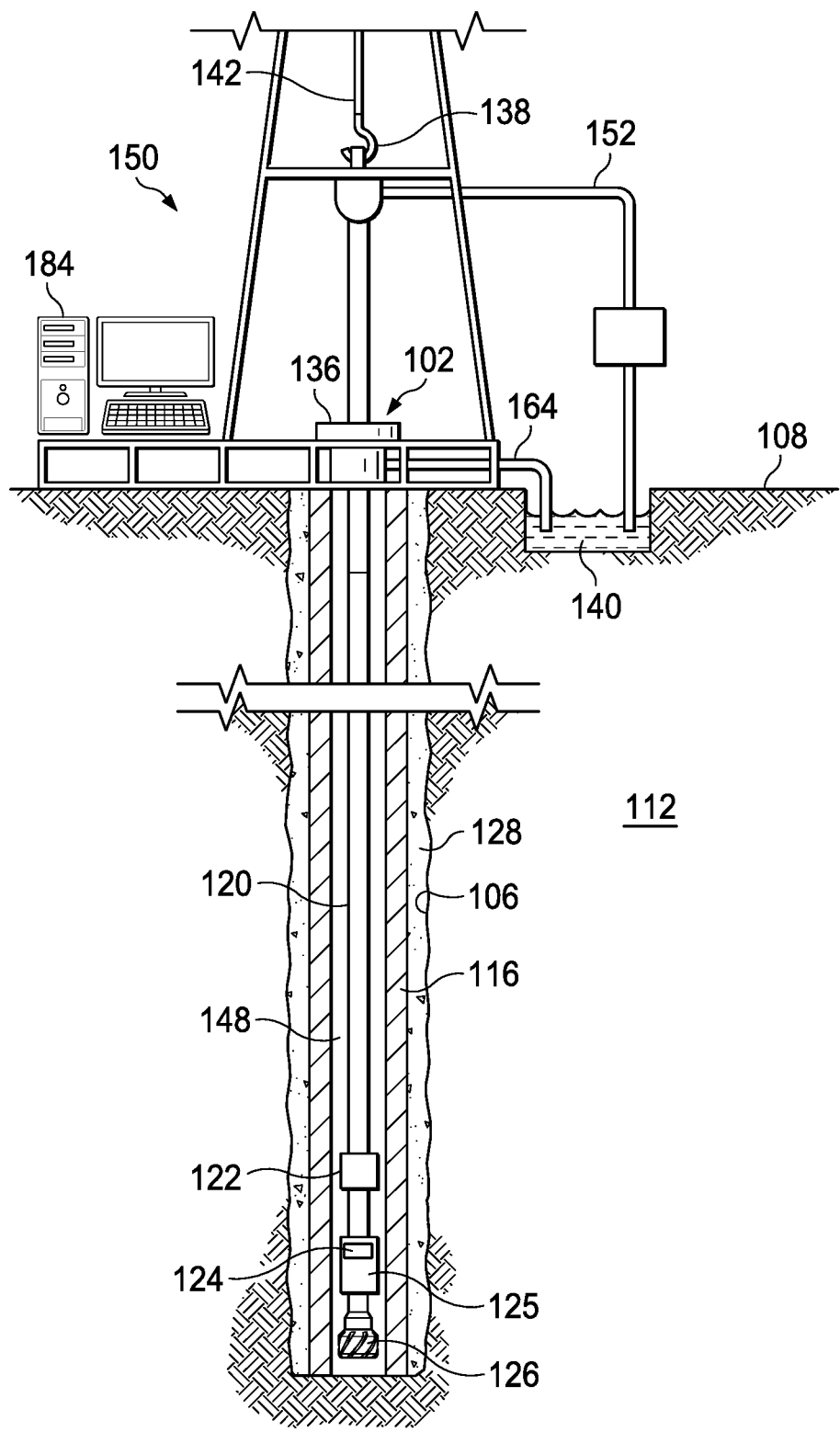
FIG. 1B illustrates a schematic view of a logging while drilling environment in which the downhole gamma-ray generator of FIG. 1A is deployed in an annulus of the casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole gamma-ray generators, methods to generate gamma-rays in a downhole environment, and methods to log formation data. In some embodiments, the downhole gamma-ray generator includes a target foil positioned in a housing of the downhole gamma-ray generator, and having a second layer deposited on a back side of the target foil. In one of such embodiments, the target foil is formed from titanium. In another one of such embodiments, the target foil is formed from aluminum. As defined herein, a front side is a side that faces toward a direction of an incoming laser beam ("optical pulses") and/or ions, whereas a back side is a side that faces away from a direction of incoming optical pulses and/or ions. As such, the front side of the target foil faces the incoming optical pulses, whereas the back side of the target foil faces away from the incoming optical pulses. Similarly, the front side of the second layer faces electrons generated by ionization of atoms of the target foil.

The second layer is formed from a high-density material, such as tungsten. In some embodiments, the downhole gamma-ray generator also includes a heatsink positioned in the housing and coupled to the second layer. In one of such embodiments, the heatsink is formed from copper or another material having high thermal conductivity to dissipate heat generated by reactions described herein that produce gamma-rays.

The downhole gamma-ray generator also includes a laser system, such as a Chirped Pulse Amplification ("CPA") type, or another type of tunable laser system that is oriented and operable to direct a focused beam of optical pulses onto the front surface of the target foil, where the beam of optical pulses ionizes atoms along the front surface of the target foil, thereby creating a plasma of electrons and positive ions. In some embodiments, the tunable laser system includes a laser source that is operable to generate ultra-short optical pulses that are in the femto-second range and further operable to project the generated optical pulses toward the housing. In some embodiments, the generated optical pulses are transmitted directly through a window of the housing to the front side of the target foil. In other embodiments, the tunable laser system includes one or more mirrors, reflectors, and/or similar components that are oriented to focus the generated optical pulses and/or to redirect the generated optical pulses through the window of the housing to the front side of the target foil. In some embodiments, the laser system is operable to adjust at least one of an intensity, timing, frequency, and amplitude of the optical pulses to produce a desired level of ionization of atoms of the target foil. In some embodiments, electrons generated by the ionization of atoms of the target foil are accelerated by a Ponderomotive force and propagate through a back surface of the target foil. Additional descriptions of the Ponderomotive force and example methods to calculate the Ponderomotive force are provided in the paragraphs below.

Some of the electrons that propagate through the back surface of the target foil interact with the materials that form the second layer, such as tungsten, and are decelerated due to collisions with the atoms of the second layer. The deceleration of electrons in turn produce gamma-rays in a process known as Bremsstrahlung radiation, and the produced gamma-rays propagate through the downhole gamma-ray generator and into the surrounding formation.

In some embodiments, the produced gamma-rays have energies of approximately 662 KeV, which is approximately the same amount of energy generated by some conventional methods to generate gamma-rays discussed in the foregoing paragraphs. As such, the downhole gamma-ray generators disclosed herein are compatible with existing gamma-ray based logging models and formulas that utilize gamma-rays having approximately 662 KeV of energy. However, as stated herein, the tunable laser system is operable to produce gamma-rays having energies between 0-10 MeV by adjusting at least one of the intensity, timing, frequency, and amplitude of the optical pulses. As such, the gamma-ray generators disclosed herein are operable to produce gamma-rays having a broad range energies that may be adjusted based on formation properties of the surrounding formation, the specification of the wellbore, the desired penetration of the gamma-rays, as well as other considerations described herein.

In some embodiments, the outer diameter of the downhole gamma-ray generator is less than or equal to 2 inches and the length of the downhole gamma-ray generator is less than 2 feet long. These dimensions are significantly smaller than the dimensions of x-ray tubes and UHV units as well as downhole gamma-ray generators that utilize x-ray tubes and/or UHV units. Further, it is also much more feasible to deploy downhole gamma-ray generators disclosed herein in different sections of a well having different dimensions relative to downhole gamma-ray generators that utilize x-ray tubes or UHV units. Additional details of the foregoing downhole gamma-ray generators, methods to generate gamma-rays in a downhole environment, and methods to log formation data information are provided in the paragraphs below and are illustrated in at least FIGS. 1-4.

Now turning to the figures, FIG. 1A illustrates a schematic view of a wireline logging environment 100 in which a downhole gamma-ray generator 122 is deployed on a wireline 119 in wellbore 106. As stated herein, the downhole gamma-ray generator 122 includes a laser system and a housing, which contains a target foil, a second layer deposited on the back surface of the target foil, and a heat sink housed within the housing. In some embodiments, the laser system is a tunable laser system. Additional discussions of various components of the downhole gamma-ray generator 122 are provided in the paragraphs below and are illustrated in at least FIGS. 2-4.

In the embodiment of FIG. 1A, a well having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 128, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying controller 184 and the wireline 119 is positioned proximate the well 102. The wireline 119 along with the downhole gamma-ray generator 122 and a logging tool 125 having a sensor 124 are lowered through blowout preventer 103 into the well 102. Data indicative of measurements obtained by the logging tool 125 may be transmitted via the wireline 119 or via another telemetry system to the surface 108 for processing by controller 184 or by another electronic device operable to process data obtained by the logging tool 125. The controller 184 may include any electronic and/or optoelectronic device operable to receive data and/or process data indicative of one or more formation properties to determine the formation properties. In the embodiment of FIG. 1A, the controller 184 is stored on the vehicle 180. In some embodiments, the controller 184 may also be housed in a temporary and/or permanent facility (not shown) proximate the well 102. In other embodiments, the controller 184 may also be deployed at a remote location relative to the well 102. Additional operations of the controller 184 are provided in the paragraphs below. In some embodiments, the controller 184 includes a storage medium containing instructions on how to process signals indicative of the formation properties to determine formation properties and a processor operable to execute the instructions to determine the formation properties. In further embodiments, signals transmitted along the wireline 119 are relayed by another device or telemetry system to the controller 184. In some embodiments, the controller 184, the downhole gamma-ray generator 122, and the sensor 124 are components of a downhole neutron generating system deployed at the well 102.

FIG. 1B is a schematic, side view of a logging while drilling (LWD) environment 150 in which the downhole gamma-ray generator 122 of FIG. 1A is deployed in the wellbore 106 to detect leaks long the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string, or another type of tool string operable to deploy the downhole gamma-ray generator 122. At wellhead 136, an inlet conduit 152 is coupled to a fluid source (not shown) to provide fluids, such as drilling fluids, downhole. The tool string 120 has an internal annulus that provides a fluid flow path from the surface 108 down to drill bit 126. The tool string 120 is coupled to the downhole gamma-ray generator 122 and the logging tool 125, which in the embodiment of FIG. 1B, includes the sensor 124. The fluids travel down the tool string 120, and exit the tool string 120 at the drill bit 126. The fluids flow back towards the surface 108 through a wellbore annulus 148 and exit the wellbore annulus 148 via an outlet conduit 164 where the fluids are captured in a container 140.

Once the downhole gamma-ray generator 122 is lowered to a desired location, one or more methods described herein may be utilized to produce gamma-rays at an operator's discretion or may be utilized to terminate production of gamma-rays. More particularly, optical pulses generated by the laser source component of the downhole gamma-ray generator 122 ionize the surface of the front side of the target layer and create a plasma of electrons and positive ions. The propagation of electrons created by an intense beam of optical pulses across a thin solid target is governed by the Lorentz force and may be expressed by the following equation:

$$F = \frac{d\vec{p}}{dt} = m_e \frac{d\vec{v}}{dt} = -e(\vec{E} + \vec{v} \times \vec{B}) \quad \text{EQ. 1}$$

where $\vec{p}$ is the electron's momentum, $\vec{v}$ is the electron's velocity, $m_e$ is the electron's rest mass, e is the elementary charge, $\vec{E} = E_0 \cos(kz - wt)\hat{x}$ and $\vec{B} = B_0 \cos(kz - wt)\hat{y}$ are the time dependent electric and magnetic fields. For the case of non-relativistic electrons, EQ. 2 may be approximated by the following equation:

$$F = m_e a = m_e \omega^2 z = -eE \Rightarrow z = \frac{eE}{m_e \omega^2} \quad \text{EQ. 2}$$

where the $\vec{v} \times \vec{B}$ term has been neglected due to $vB = vE/c \square 1$ for $v \square c$.

In some embodiments, the energy of an oscillating electron may then be obtained by the following equation:

$$U_p = \left\langle \frac{1}{2} m_e (\omega z)^2 \right\rangle = \frac{1}{2} m_e \omega^2 \left( \frac{eE}{m_e \omega^2} \right)^2 = \frac{e^2 E_0^2}{4 m_e \omega^2} \quad \text{EQ. 3}$$

where the energy expressed by EQ. 3 is the Ponderomotive energy and the force associated with it may be expressed by the following equation:

$$F_p = \frac{d}{dz}\left(-\frac{e^2 E^2}{4 m_e \omega^2}\right) = -\frac{e^2}{4 m_e \omega^2} \nabla E^2 \quad \text{EQ. 4}$$

Further, the intensity of an EM wave may be expressed as the following:

$$I = \frac{1}{2} \varepsilon_0 c E^2 \quad \text{EQ.5}$$

By applying EQ.5, the Ponderomotive energy may also be expressed in terms of the laser's intensity and wavelength as the following:

$$U_P[\text{eV}] = \frac{e^2 E_0^2}{4 m_e^2 \omega^2} = \frac{e^2}{8\pi^2 m_e^2 \varepsilon_0 c^5} I\lambda^2 \square 9.34 \cdot 10^{-14} I[\text{Wcm}^{-2}](\lambda[\mu m])^2 \quad \text{EQ. 6}$$

By applying EQ.3, the velocity may be expressed as the following:

$$v = \omega z = \frac{eE}{m_e \omega} \quad \text{EQ. 7}$$

The normalized momentum may be expressed as the following:

$$\vec{a} = \frac{\vec{p}}{m_e c} = \frac{\vec{v}}{c} = \frac{e\vec{E}}{m_e \omega c} \quad \text{EQ. 8}$$

and may be defined from where the following equation may be derived.

$$a^2 = \frac{E_0^2}{2} \frac{e^2}{m_e^2 \omega^2 c^2} = \frac{a_0^2}{2} \quad \text{EQ. 9}$$

For the case of relativistic electrons where $\vec{v} \times \vec{B}$ term of relativistic electrons may not be ignored, the electron motion may be described by the following equation:

$$\frac{d\vec{p}}{dt} = \frac{d}{dt}(\gamma m_e \vec{v}) = -e(\vec{E} + \vec{v} \times \vec{B}) \quad \text{EQ. 10}$$

where $$\gamma = \left(1 - \frac{v^2}{c^2}\right)^{-\frac{1}{2}}$$

is a relativistic factor. Further, the laser intensity may be expressed as EQ. 13 based on EQs. 11 and 12, which may be expressed as the following:

$$m = m_0 \gamma \Rightarrow m_0^2 c^2 = m^2 c^2 - m^2 v^2$$

$$\frac{m_0^2 c^2}{m_0^2 c^2} = \frac{m^2 c^2}{m_0^2 c^2} - \frac{m^2 v^2}{m_0^2 c^2} \Rightarrow 1 = \quad \text{EQ. 11}$$

$$\frac{m^2}{m_0^2} - \frac{p^2}{m_0^2 c^2} \Rightarrow \gamma = \frac{m}{m_0} = \left(1 + \left(\frac{p}{m_0 c}\right)^2\right)^{\frac{1}{2}}$$

$$\gamma = \left(1 - \frac{v^2}{c^2}\right)^{-\frac{1}{2}} = \left(1 + \left(\frac{p}{m_e c}\right)^2\right)^{\frac{1}{2}} = \sqrt{1 + \frac{a_0^2}{2}} \quad \text{EQ. 12}$$

$$I = \frac{a_0^2}{\lambda^2} \frac{c\varepsilon_0 m_e^2 \omega^2 c^2}{e^2} = \frac{a_0^2}{\lambda^2} \frac{\varepsilon_0 c\pi^2 m_e^2 c^2 c^2}{e^2} \square 0.685 \cdot 10^{18} \frac{a_0^2}{\lambda^2} \quad \text{EQ. 13}$$

In EQ. 13, the intensity of the optical pulses is expressed in $\text{Wcm}^{-2}$ and the wavelength in $\mu m$. Using EQ.13, the Ponderomotive energy for the relativistic electrons may be expressed as the following:

$$U_{Prel}[\text{MeV}] = m_e c^2 (\gamma - 1) = 0.511 \left( \sqrt{1 + \frac{a_0^2}{2}} - 1 \right) = \quad \text{EQ. 14}$$

-continued $$0.511\left(\sqrt{1+(1/0.685\cdot 10^{18})I[\text{Wcm}^{-2}\lambda^2[\mu m]^2}-1\right)$$

In some embodiments, EQs. 6 and 14 are utilized to estimate the energy to which non-relativistic and relativistic electrons are accelerated by the Ponderomotive potential. As discussed herein, the downhole gamma-ray generator 122 is operable to replace conventional always on gamma-ray sources that utilize Cesium 137 by producing gamma-rays having approximately 662 KeV of energy. In one of such embodiments, the laser system component of the downhole gamma-ray generator 122 utilizes a Carbon Dioxide ("$CO_2$") type laser. A desired intensity of the $CO_2$ laser may be determined utilizing EQs. 6 and 14 provided in the paragraphs above. Exemplary steps for determining the intensity of the $CO_2$ laser are provided in the equations below.

$$0.662\cdot 10^6 \square 9.34\cdot 10^{-14} I\lambda^2 \Rightarrow \qquad \text{EQ. 15}$$

$$I\square \frac{0.662\cdot 10^6}{9.34\cdot 10^{-14}(10.6)^2} \square 6.33\cdot 10^{16}\ \text{Wcm}^{-2}$$

where optical pulses generated by the $CO_2$ laser is assumed to have a wavelength of approximately 10.6 μm. Power associated with the intensity of the $CO_2$ laser may be estimated by solving the following equation:

$$I = 6.33\cdot 10^{16}\ \text{Wcm}^{-2} = \qquad \text{EQ. 16}$$

$$\frac{P}{A} \Rightarrow P = 6.33\cdot 10^{16}\frac{W}{cm^2}\frac{cm^2}{10^8\mu m^2}10\mu m^2\square 6.33\ \text{GW}$$

In EQ. 16, the optical beam is assumed to have a spot size of 10 μm². Further, 6.33 GW of power may be obtained from a $CO_2$ laser having a pulse duration of 0.1 ps, a repetition rate of 1 kHz, and requiring an amount of power that may be determined by the following equation:

$$P_l = 6.33\cdot 10^9 \frac{J}{s}\cdot 0.1\cdot 10^{-12}s\cdot 1kHz\square 0.633\ mJ\frac{10^3}{s} = 0.633\ W \qquad \text{EQ. 17}$$

Conventional downhole electrostatic accelerators that are utilized to accelerate particles into the formation sometimes require approximately 30 W of power to operate. As shown in EQ. 17, the $CO_2$ laser of the downhole gamma-ray generator 122 may operate on approximately 2 magnitudes less power to generate gamma-rays having approximately the same level of energy as gamma-rays that are generated by conventional always on gamma-ray sources.

In another one of such embodiments, the laser system component of the downhole gamma-ray generator 122 utilizes a Titanium Sapphire ("Ti:Sapphire") type laser. A desired intensity of the Ti:Sapphire laser may also be determined utilizing EQs. 6 and 14 provided in the paragraphs above. Exemplary steps for determining the intensity of the $CO_2$ laser are provided in the equations below:

$$0.662\cdot 10^6 \square 9.34\cdot 10^{-14} I\lambda^2 \Rightarrow \qquad \text{EQ. 18}$$

$$I\square \frac{0.662\cdot 10^6}{9.34\cdot 10^{-14}(0.8)^2} \square 1.1\cdot 10^{19}\ \text{Wcm}^{-2}$$

where optical pulses generated by the $CO_2$ laser is assumed to have a wavelength of approximately 0.8 μm. Power associated with the intensity of the Ti:Sapphire laser may be estimated by solving the following equation:

$$I = 1.11.1\cdot 10^{19} \text{Wcm}^{-2} \frac{P}{A} \Rightarrow P = \qquad \text{EQ. 19}$$

$$1.1\cdot 10^{19}\frac{W}{cm^2}\frac{cm^2}{10^8\mu m^2}1\ \mu m^2 \square 0.11\ \text{TW}$$

In EQ. 19, the optical beam is assumed to have a spot size of 10 μm². Further, 0.11 TW power may be obtained from a Ti:Sapphire laser having a pulse duration of 0.1 ps, a repetition rate of 1 kHz, and requiring an amount of power that may be determined by the following equation:

$$P_l = 0.11\cdot 10^{12}\frac{J}{s}\cdot 0.1\cdot 10^{-12}s\cdot 1\ kHz\square 0.011J\frac{10^3}{s}\square 11\ W \qquad \text{EQ. 20}$$

Although in some embodiments, a Ti:Sapphire laser downhole gamma-ray generator 122 may utilize approximately 11 W of power to generate gamma-rays having approximately 662 KeV of energy, this amount of power is still approximately 33% of power needed by the Conventional downhole electrostatic accelerators discussed herein. As such, the amount of power utilized by the downhole gamma-ray generator 122 is significantly lower than conventional downhole electrostatic accelerators.

The produced gamma-rays propagate into the subterranean formation 112. The sensor 124 component of the logging tool 125 is operable to measure return signals indicative of the formation properties. In one of such embodiments, the return signals correspond to components of the gamma-rays that are transmitted into the formation and subsequently scattered back by the subterranean formation 112, and the sensor 124 is operable to measure the scattered back gamma-rays to determine the formation properties of the subterranean formation 112. In some embodiments, the logging tool 125 is coupled to or is deployed proximate to the downhole gamma-ray generator 122. In some embodiments, data indicative of the measured formation properties is stored in a local storage medium that is deployed at a downhole location proximate to the logging tool 125. In other embodiments, the data is transmitted along the wireline 119 uphole, where the data is analyzed by controller 184 to determine the formation properties.

Although FIGS. 1A and 1B illustrate the downhole gamma-ray generator 122 deployed in two exemplary environments, the downhole gamma-ray generator 122 may be deployed in various drilling, completion, and production environments. Further, although the FIGS. 1A and 1B illustrate the downhole gamma-ray generator 122 and the logging tool 125 as separate devices, in some embodiments, the downhole gamma-ray generator 122 is a component of the logging tool 125.

Figure 2:
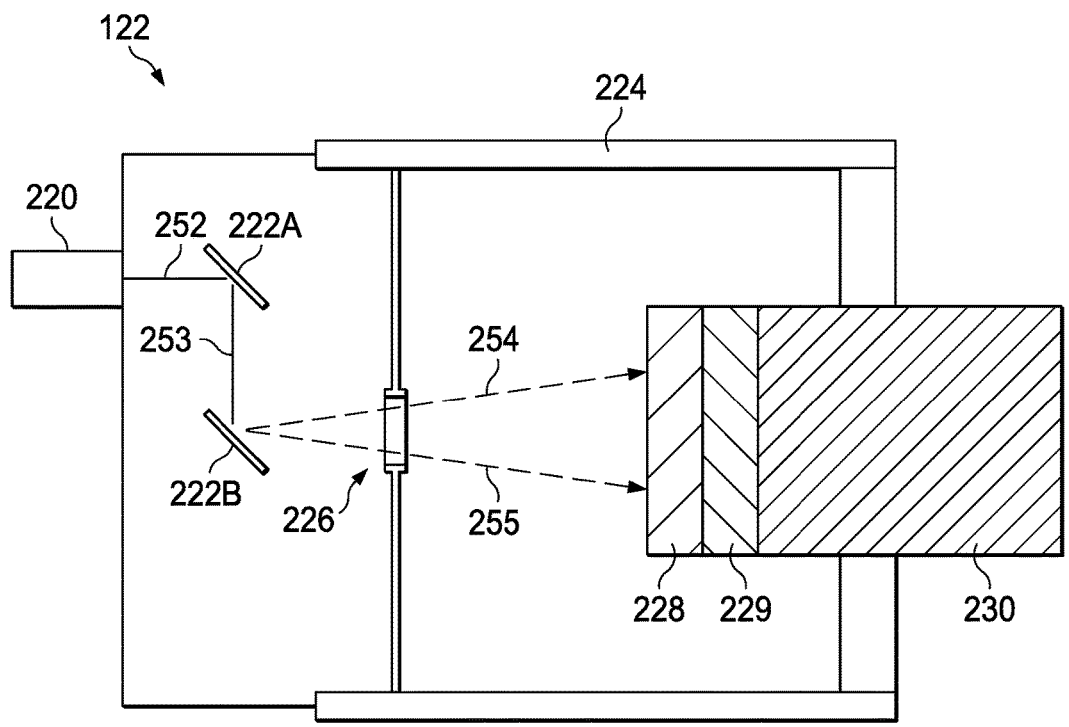
FIG. 2 illustrates a schematic view of the downhole gamma-ray generator of FIG. 1A.

FIG. 2 illustrates a schematic view of the downhole gamma-ray generator 122 of FIG. 1A. As shown in FIG. 2, the downhole gamma-ray generator 122 includes a laser system, which includes laser source 220 and mirrors 222A and 222B. The downhole gamma-ray generator 122 also includes a housing 224 which stores additional components discussed herein and utilized to initiate one or more types of fusion reactions to generate gamma-rays.

The housing 224 houses a target foil 228 and a second layer 229 deposited on a back side of the target foil 228. In some embodiments, the housing forms a vacuum chamber that houses the foregoing components. In some embodiments, the target foil 228 is formed form an aluminum. In some embodiments, the second layer is formed from a metal such as tungsten. The housing 224 also houses a heat sink 230 that is operable to dissipate an amount of heat generated by the reactions described herein to produce gamma-rays. In some embodiments, the heat sink 230 is formed from copper or another material having high thermal conductivity to facilitate heat dissipation.

The laser source 220 may be any optoelectronic device oriented and operable to generate beams of optical pulses and further operable to transmit the optical pulses towards the front side of the target foil 228. In some embodiments, the laser source utilizes CPA techniques or other techniques to generate ultra-short optical pulses and to project the generated optical pulses toward the front side of the target foil 228. In one of such embodiments, the laser source is a $CO_2$ type laser. In another one of such embodiments, the laser source is a Ti:Sapphire type laser source. As shown in FIG. 2, optical pulses generated by the laser source 220 travel in a direction indicated by arrow 252. The laser system also includes mirrors 222A and 222B. The mirrors 222A and 222B may be constructed from materials oriented to focus, reflect, and/or redirect the optical pulses. As shown in FIG. 2, the optical pulses traveling in a direction indicated by arrow 252 are reflected by the mirror 222A to travel in a direction indicated by arrow 253, and are reflected by mirror 222B to travel in directions indicated by arrows 254 and 255.

The optical pulses traveling in directions indicated by arrows 254 and 255 penetrate a window 226 of the housing 224 to reach the target foil 228 and create a plasma of electrons and positive ions. Some of the electrons generated by the ionization of the target foil 228 accelerate through the target foil 228 and exit the back side of the target foil 228, which is coupled to a front side of the second layer 229. As stated herein, the second layer 229 is formed from a high density metal, such as tungsten, which decelerates the electrons when the electrons collide with the second layer 229. The foregoing interaction between the electrons and the second layer 229 produces gamma-rays, which propagate into the subterranean formation 112.

The downhole gamma-ray generator 122 may be readily turned on and/or off by controlling the laser system. In some embodiments, the downhole gamma-ray generator 122 has an on and off switch time of less than 1 microsecond. Further, at least one of the intensity, timing, frequency, and amplitude of the optical pulses generated by the laser source 220 may be adjusted to generate gamma-rays having a desired amount of energy. As described herein, in some embodiments, the laser source 220 may be adjusted ("tuned") to generate gamma-rays having an energy level of approximately 662 KeV, which corresponds to the approximate energy level of gamma-rays generated by some conventional gamma-ray sources. In further embodiments, the laser source 220 may be tuned to generate gamma-rays having energy levels between 0-10 MeV. In some embodiments, the downhole gamma-ray generator 122 has an outer diameter of less than 2 inches and a length of less than 2 feet. As such, the downhole gamma-ray generator 122 may be easily deployed in an annulus of a casing and may be turned on during wireline logging operations, LWD operations, MWD operations, and/or other logging operations.

Figure 3:
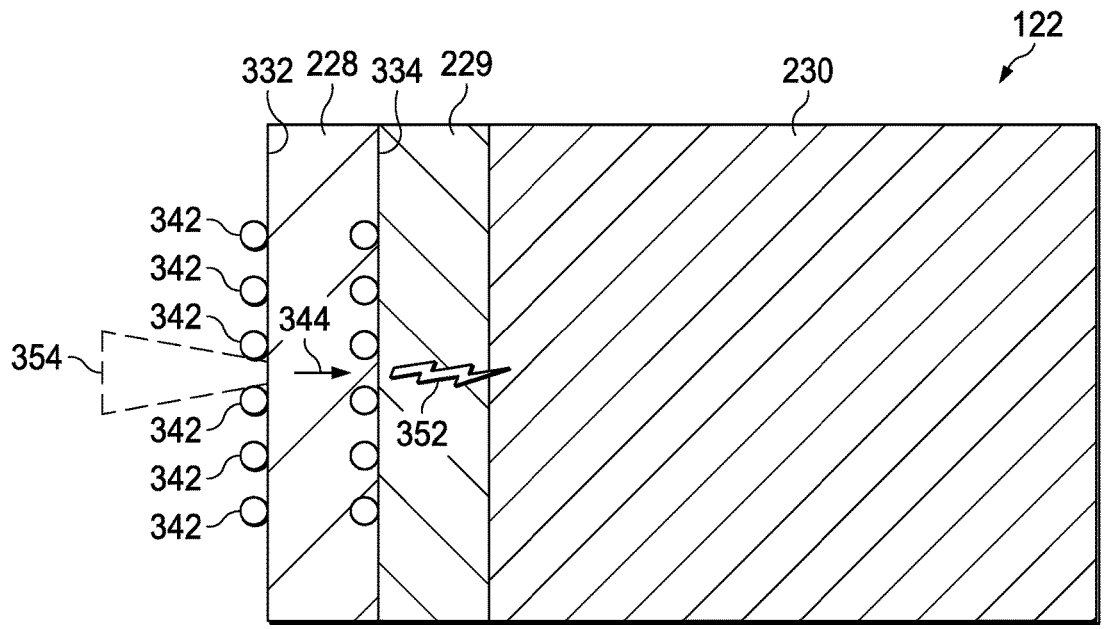
FIG. 3 illustrates an enlarged view of electrons propagating through a target foil of the gamma-ray generator of FIG. 2, and producing gamma-rays when the electrons interact with a second layer of the gamma-ray generator.

FIG. 3 illustrates an enlarged view of electrons 342 propagating through the target foil 228 of the gamma-ray generator 122 of FIG. 2, and producing gamma-rays 342 when the electrons 342 interact with the second layer 229 of the gamma-ray generator 122. In the embodiment of FIG. 3, the target foil 228 is formed from a titanium layer and has a thickness between 10-50 μm. Further the second layer 229 is formed from tungsten a thickness of approximately 10-50 μm. In other embodiments, the target foil 228 and the second layer 229 each a thickness between 1-20 μm. In further embodiments, the target foil 228 and the second layer 229 each has a different thickness. Optical pulses represented by triangular beam 354 are projected onto a front surface 332 of the target foil 228 and ionizes titanium deposited proximate the front surface 332 of the target foil 228, thereby creating a plasma of electrons and positive ions. As stated herein, some of the electrons 342 traverse through the target foil 228 in a direction indicated by arrow 344, exit the target foil 228 through a back side 334 of the target foil 228, and collide with tungsten deposited proximate a front side of the second layer 229. The foregoing interaction decelerates the electrons 342 and produce gamma-rays 352, which propagate into the subterranean formation 112. The heatsink 230 is coupled to the second layer 229 and is operable to dissipate an amount of heat generated during the gamma-ray production process described herein.

Figure 4:
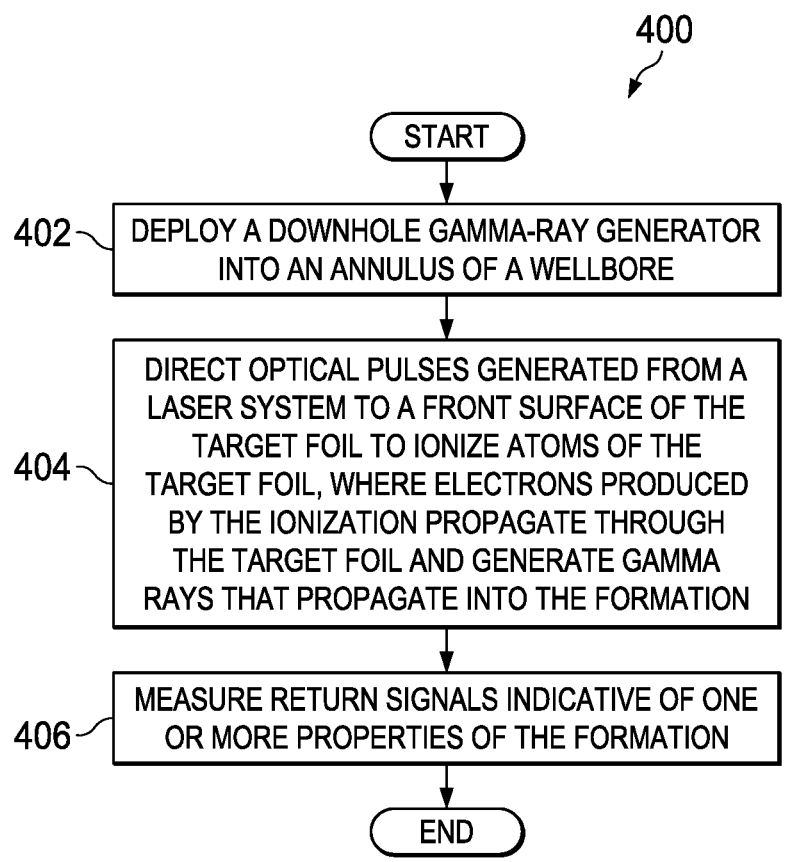
FIG. 4 illustrates a flow chart of a process to log data indicative of one or more formation properties of the surrounding formation.

FIG. 4 illustrates a flow chart of a process 400 to log data indicative of one or more formation properties of the surrounding formation. Although operations in the process 400 are shown in a particular sequence, certain operations may be performed in different sequences or at the same time where feasible. Further, although the operations in the process 400 are described to be performed by the downhole gamma-ray generator 122, the operations may also be performed by other embodiments of a downhole gamma-ray generator described herein.

At step 402, the downhole gamma-ray generator 122 is deployed into an annulus of the wellbore 106. For example, in the embodiment illustrated in FIG. 1A, the downhole gamma-ray generator 122 is deployed via the wireline 119 into an annulus of the casing 116 to a desired depth. At step 404, the laser source 220 generates optical pulses which are directed to the target foil 228 to ionize atoms of the target foil 228. Some of the electrons produced by the ionization of the atoms of the target foil 228, accelerate through the target foil 228, exit the back surface of the target foil 228, and collide with atoms of a second layer 229, which is deposited on the backside of the target foil 228. The collisions of the electrons traversing through the target foil 228 in turn produces gamma-rays which propagate into the subterranean formation 112. As described herein, at least one of the intensity, timing, frequency, and amplitude of optical pulses generated by the laser source 220 may be tuned to produce gamma-rays having a desired level of energy.

At step 406, the sensor 124 component of the logging tool 125 measures return signals of the gamma-rays that propagate into the subterranean formation 112, where the return signals are indicative of one or more properties of the subterranean formation 112. The logging tool 125 may store the measured properties of the subterranean formation 112 in a local storage medium and/or may transmit the properties of the subterranean formation 112 via the wireline 119 to the controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a downhole gamma-ray generator comprising a target foil formed from a first material; a tunable laser system oriented to direct optical pulses onto a front surface of the target foil to ionize atoms of the first material; and a second layer formed from a high density material and deposited along a back surface of the target foil.

Clause 2, the downhole gamma-ray generator of clause 1, wherein the target foil and the second layer are stored within a housing unit of the downhole gamma-ray generator.

Clause 3, the downhole gamma-ray generator of clause 1 or clause 2, wherein the tunable laser system utilizes a chirped pulse amplification technique to amplify the optical pulses.

Clause 4, the downhole gamma-ray generator of at least one of clauses 1-3, wherein the tunable laser system is operable to adjust at least one of an intensity, timing, frequency, and amplitude of the optical pulses.

Clause 5, the downhole gamma-ray generator of at least one of clauses 1-4, wherein the tunable laser system utilizes a carbon dioxide laser to generate the optical pulses.

Clause 6, the downhole gamma-ray generator of at least one of clauses 1-4, wherein the tunable laser system utilizes a titanium sapphire laser to generate the optical pulses.

Clause 7, the downhole gamma-ray generator of at least one of clauses 1-6, wherein the tunable laser system comprises one or more mirrors oriented to focus the optical pulses through a window of the housing to the target foil.

Clause 8, the downhole gamma-ray generator of at least one of clauses 1-7, wherein the housing further comprises a heat-sink coupled to the second layer and operable to absorb heat generated from production of the gamma-rays.

Clause 9, the downhole gamma-ray generator of at least one of clauses 1-8, wherein the target foil is formed from at least one of aluminum and titanium and has a thickness of approximately 1-20 μm and wherein the second layer is formed from tungsten and has a thickness of approximately 1-20 μm.

Clause 10, the downhole gamma-ray generator of at least one of clauses 1-9, wherein an ultra-high voltage section is not utilized to produce the gamma-rays.

Clause 11, the downhole gamma-ray generator of clauses 1-10, wherein the gamma-rays produced by the downhole gamma-ray generator have approximately 0-10 MeV of energy.

Clause 12, the downhole gamma-ray generator of at least one of clauses 1-11, wherein the gamma-rays produced by the downhole gamma-ray generator have approximately 662 KeV of energy.

Clause 13, the downhole gamma-ray generator of clauses 1-12, wherein the downhole gamma-ray generator has an on and off switch time of lower than 1 micro second.

Clause 14, the downhole gamma-ray generator of at least one of clauses 1-13, wherein the downhole gamma-ray generator is operable to fit within an annulus of a production casing, and wherein the downhole gamma-ray generator has an outer diameter less than 2 inches and a length of less than 24 inches.

Clause 15, a downhole logging system, comprising a downhole gamma-ray generator deployed in an annulus of a wellbore and having a target foil formed from at least one of aluminum and titanium; a tunable laser system oriented to utilize a chirped pulse amplification technique to amplify optical pulses produced by a laser of the tunable laser system; and direct the amplified optical pulses onto a front surface of the target foil to ionize the at least one of the aluminum and titanium; and a second layer formed from tungsten and deposited along a back surface of the target foil, and a logging tool having at least one sensor operable to detect return signals of the gamma-rays that propagate into the formation, the return signals indicative of one or more properties of the formation.

Clause 16, the downhole logging system of clause 15, wherein the gamma-rays produced by the downhole gamma-ray generator have approximately 0-10 MeV of energy.

Clause 17, the downhole logging system of clause 15 or 16, wherein the downhole gamma-ray generator is operable to fit within an annulus of a production casing, and wherein the downhole gamma-ray generator has an outer diameter less than 2 inches and a length of less than 24 inches.

Clause 18, a method to log a formation, comprising deploying a downhole gamma-ray generator into an annulus of a wellbore, the downhole gamma-ray generator having a target foil formed from a first material; a laser system operable to direct optical pulses onto a front surface of the target foil to ionize atoms of the first material; and a second layer formed from a high density material and deposited along a back surface of the target foil; directing optical pulses generated from the laser system to a front surface of the target foil to ionize atoms of the target foil, wherein electrons produced by ionization of the first material propagate through the target foil and decelerate when the electrons interact with the high density material, and wherein the deceleration of the electrons produces gamma-rays that propagate into the formation; and measuring return signals of the gamma-rays that propagate into the formation, the return signals indicative of one or more properties of the formation.

Clause 19, the method of clause 18, further comprising adjusting at least one of an intensity, timing, frequency, and amplitude of the optical pulses to generate gamma-rays having approximately 0-10 MeV of energy.

Clause 20, the method of clause 18 or 19, further comprising adjusting the at least one of the intensity, timing, frequency, and amplitude of the optical pulses to generate gamma-rays having approximately 662 KeV of energy.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A downhole gamma-ray generator comprising:
   a target foil formed from a first material;
   a tunable laser system oriented to direct optical pulses onto a front surface of the target foil to ionize atoms of the first material; and
   a second layer deposited on a back surface of the target foil.

2. The downhole gamma-ray generator of claim 1, wherein the target foil and the second layer are stored within a housing unit of the downhole gamma-ray generator.

3. The downhole gamma-ray generator of claim 2, wherein the tunable laser system utilizes a chirped pulse amplification technique to amplify the optical pulses.

4. The downhole gamma-ray generator of claim 3, wherein the tunable laser system is operable to adjust at least one of an intensity, timing, frequency, and amplitude of the optical pulses.

5. The downhole gamma-ray generator of claim 4, wherein the tunable laser system utilizes a carbon dioxide laser to generate the optical pulses.

6. The downhole gamma-ray generator of claim 4, wherein the tunable laser system utilizes a titanium sapphire laser to generate the optical pulses.

7. The downhole gamma-ray generator of claim 3, wherein the tunable laser system comprises one or more mirrors oriented to focus the optical pulses through a window of the housing to the target foil.

8. The downhole gamma-ray generator of claim 2, wherein the housing further comprises a heat-sink coupled to the second layer and operable to absorb heat generated from production of the gamma-rays.

9. The downhole gamma-ray generator of claim 1 wherein the target foil is formed from at least one of aluminum and titanium and has a thickness of approximately 1-20 μm and wherein the second layer is formed from tungsten and has a thickness of approximately 1-20 μm.

10. The downhole gamma-ray generator of claim 1, wherein an ultra-high voltage section is not utilized to produce the gamma-rays.

11. The downhole gamma-ray generator of claim 1, wherein the gamma-rays produced by the downhole gamma-ray generator have approximately 0-10 MeV of energy.

12. The downhole gamma-ray generator of claim 11, wherein the gamma-rays produced by the downhole gamma-ray generator have approximately 662 KeV of energy.

13. The downhole gamma-ray generator of claim 1, wherein the downhole gamma-ray generator has an on and off switch time of lower than 1 micro second.

14. The downhole gamma-ray generator of claim 1, wherein the downhole gamma-ray generator fits within an annulus of a production casing, and wherein the downhole gamma-ray generator has an outer diameter less than 2 inches and a length of less than 24 inches.

15. A downhole logging system, comprising:
   a downhole gamma-ray generator deployed in an annulus of a wellbore and having:
      a target foil formed from at least one of aluminum and titanium;
      a tunable laser system operable to:
         utilize a chirped pulse amplification technique to amplify optical pulses produced by a laser of the tunable laser system; and
         direct the amplified optical pulses onto a front surface of the target foil to ionize the at least one of the aluminum and titanium; and
      a second layer formed from tungsten and deposited on a back surface of the target foil; and
   a logging tool having at least one sensor operable to detect return signals of the gamma-rays that propagate into the formation, the return signals indicative of one or more properties of the formation.

16. The downhole logging system of claim 15, wherein the gamma-rays produced by the downhole gamma-ray generator have approximately 0-10 MeV of energy.

17. The downhole logging system of claim 16, wherein the downhole gamma-ray generator is operable to fit within an annulus of a production casing, and wherein the downhole gamma-ray generator has an outer diameter less than 2 inches and a length of less than 24 inches.

18. A method to log a formation, comprising:
   deploying a downhole gamma-ray generator into an annulus of a wellbore, the downhole gamma-ray generator having:
      a target foil formed from a first material;
      a laser system operable to direct optical pulses onto a front surface of the target foil to ionize atoms of the first material; and
      a second layer formed from a high density material and deposited on a back surface of the target foil;
   directing optical pulses generated from the laser system to a front surface of the target foil to ionize atoms of the target foil, wherein electrons produced by ionization of the first material propagate through the target foil and decelerate when the electrons interact with the high density material, and wherein the deceleration of the electrons produces gamma-rays that propagate into the formation; and
   measuring return signals of the gamma-rays that propagate into the formation, the return signals indicative of one or more properties of the formation.

19. The method of claim 18, further comprising adjusting at least one of an intensity, timing, frequency, and amplitude of the optical pulses to generate gamma-rays having approximately 0-10 MeV of energy.

20. The method of claim 19, further comprising adjusting the at least one of the intensity, timing, frequency, and amplitude of the optical pulses to generate gamma-rays having approximately 662 KeV of energy.

* * * * *